US012305612B2

United States Patent
Enevoldsen et al.

(10) Patent No.: US 12,305,612 B2
(45) Date of Patent: May 20, 2025

(54) WIND TURBINE BLADE AND WIND TURBINE WITH A PLURALITY OF ADD-ON ELEMENTS

(71) Applicant: Siemens Gamesa Renewable Energy A/S, Brande (DK)

(72) Inventors: Peder Bay Enevoldsen, Vejle (DK); Peter Fuglsang, Vejle (DK); Florian Girschig, Skørping (DK); Jonas Madsen, Tjæreborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 22 days.

(21) Appl. No.: 18/555,138

(22) PCT Filed: Mar. 8, 2022

(86) PCT No.: PCT/EP2022/055901
§ 371 (c)(1),
(2) Date: Oct. 12, 2023

(87) PCT Pub. No.: WO2022/223194
PCT Pub. Date: Oct. 27, 2022

(65) Prior Publication Data
US 2024/0191687 A1    Jun. 13, 2024

(30) Foreign Application Priority Data
Apr. 19, 2021 (EP) .................................... 21169132

(51) Int. Cl.
*F03D 1/06* (2006.01)

(52) U.S. Cl.
CPC ...... *F03D 1/0675* (2013.01); *F05B 2240/122* (2013.01); *F05B 2240/304* (2020.08);
(Continued)

(58) Field of Classification Search
CPC .... F03D 1/0675; F03D 1/0633; F03D 1/0641; F03D 13/10; F05B 2240/31; B66C 1/018
See application file for complete search history.

(56) References Cited

U.S. PATENT DOCUMENTS

| | | | |
|---|---|---|---|
| 4,818,004 A * | 4/1989 | Oswalt ..................... | B66C 1/24 294/67.5 |
| 7,918,653 B2 * | 4/2011 | Standish ................. | F03D 1/065 416/232 |

(Continued)

FOREIGN PATENT DOCUMENTS

| | | | |
|---|---|---|---|
| DE | 102011012965 A1 * | 9/2012 | ........... F03D 1/0633 |
| DE | 102013210733 A1 * | 12/2014 | ........... F03D 1/0675 |

(Continued)

OTHER PUBLICATIONS

English translation of DE102013210733A1 (Year: 2014).*
(Continued)

*Primary Examiner* — Sabbir Hasan
*Assistant Examiner* — Wesley Le Fisher
(74) *Attorney, Agent, or Firm* — Schmeiser, Olsen & Watts LLP

(57) ABSTRACT

A wind turbine blade includes a plurality of add-on elements, which are arranged on an outer surface of the blade, wherein the plurality of add-on elements includes at least one flexible add-on element and at least one stiff add-on element of the same add-on element type, wherein the flexible add-on element is made at least predominantly of an elastic material and the stiff add-on element are made at least predominantly of a stiff material, which is stiffer than the elastic material, wherein the flexible add-on element and the stiff add-on element are arranged offset in span-wise direction and/or in chord-wise direction of the blade.

20 Claims, 3 Drawing Sheets

(52) U.S. Cl.
CPC . *F05B 2240/305* (2020.08); *F05B 2240/3062* (2020.08); *F05B 2240/311* (2013.01)

(56) References Cited

U.S. PATENT DOCUMENTS

| | | | | |
|---|---|---|---|---|
| 8,061,986 | B2* | 11/2011 | Xiong | F03D 7/022 |
| | | | | 416/235 |
| 8,182,231 | B2* | 5/2012 | Corten | F03D 1/0641 |
| | | | | 416/61 |
| 8,595,931 | B2* | 12/2013 | Riddell | F03D 1/0633 |
| | | | | 29/889.6 |
| 8,870,124 | B2* | 10/2014 | Ireland | B64C 23/06 |
| | | | | 416/223 R |
| 9,475,677 | B2* | 10/2016 | Hansen | B66C 1/42 |
| 10,697,426 | B2* | 6/2020 | Hurault | F03D 1/0675 |
| 11,448,183 | B2* | 9/2022 | Arce | F03D 1/0675 |
| 11,473,555 | B2* | 10/2022 | Arce | F03D 1/0641 |
| 11,536,245 | B2* | 12/2022 | Herrig | F03D 1/0675 |
| 2008/0216301 | A1* | 9/2008 | Hansen | F03D 13/10 |
| | | | | 29/889 |
| 2009/0068018 | A1 | 3/2009 | Corten | |
| 2018/0038342 | A1 | 2/2018 | Tobin et al. | |
| 2018/0216600 | A1* | 8/2018 | Zamora Rodriguez | |
| | | | | F03D 1/0633 |
| 2019/0353141 | A1* | 11/2019 | Arce | F03D 1/0641 |
| 2020/0149507 | A1* | 5/2020 | Arce | F03D 1/0675 |

FOREIGN PATENT DOCUMENTS

| | | |
|---|---|---|
| NL | 2000301 C1 | 5/2008 |
| WO | 0116482 A1 | 3/2001 |
| WO | 2014198353 A1 | 12/2014 |
| WO | WO-2015053768 A1 * 4/2015 | ........... F03D 1/0633 |
| WO | 2015176868 A | 11/2015 |

OTHER PUBLICATIONS

PolyGlobal, "A Guide to Shore Hardness", Aug. 13, 2018, (Year: 2018).*
MatWeb, "Overview of materials for Acrylonitrile/Styrene/Acrylate (ASA), Unreinforced, Molded", Apr. 17, 2022 (Year: 2022).*
English Translation of DE102011012965A1 (Year: 2012).*
PCT International Search Report and Written Opinion of International Searching Authority mailed Jun. 10, 2022 corresponding to PCT International Application No. PCT/EP2022/055901 filed Mar. 8, 2022.

* cited by examiner

WIND TURBINE BLADE AND WIND TURBINE WITH A PLURALITY OF ADD-ON ELEMENTS

CROSS-REFERENCE TO RELATED APPLICATIONS

This application claims priority to PCT Application No. PCT/EP2022/055901, having a filing date of Mar. 8, 2022, which claims priority to EP Application No. 21169132.4, having a filing date of Apr. 19, 2021, the entire contents both of which are hereby incorporated by reference.

FIELD OF TECHNOLOGY

The following relates to a wind turbine blade comprising a plurality of add-on elements, which are arranged on an outer surface of the blade. Furthermore, the following relates to a wind turbine.

BACKGROUND

Modern wind turbine blades are often equipped with blade add-ons to enhance their aerodynamic properties. The add-ons may be attached to an outer surface of the wind turbine blade to improve the power production by the blade, to reduce the noise level of the blade and/or to adapt the aerodynamic properties of the blade. Normally, these blade add-ons protrude from the blade surface so that they bear the risk to be damaged during manufacturing, transport and/or the installation of the wind turbine, if they come in contact with a handling tool or any other structure. Therefore, it is avoided to place the surface add-ons in areas used for handling of the wind turbine blade, so that the handling zones on the blade surface constrain the positions available for the placement of the add-ons.

Another possibility to protect the add-ons from damage is to mount them on the blade after it has been installed on the wind turbine. However, this increases the effort for the installation procedure. From the state of the art, it is known to use a flexible material for the add-ons to make them more resistant against an unintended contact.

In WO 01/16482 A1, a blade for a wind turbine with turbulence-generating devices is described. The generators are arranged at the transition between the furthest upstream part of the blade and the pressure side of the blade profile. The generators consist of flexible material to avoid damage during transport of the blade.

From US 2009/0068018 A1 and NL 2000301 C1 vortex generators made from a flexible material are known, wherein as a flexible material rubber, polyurethane or an elastomer is used.

WO 2014/198353 A1 discloses a rotor blade for a wind power plant having a vane arranged on a surface of the rotor blade for influencing an air flow on the surface. The vane comprises a flexible area and a stiff area, wherein a force acting on the vane during operation of the rotor blade may lead to a deformation and/or change of the orientation of the vane. By a tilting of the vane, the aerodynamical cross section of the vane is reduced, so that also a force leading to the tilting is reduced and an equilibrium state is obtained.

However, depending of the operating conditions of the wind turbine, it may be possible that add-ons consisting of a stiff material have better aerodynamical properties and/or a better resistance against environmental influences compared to add-ons of the same add-on type that consist of a flexible material.

SUMMARY

An aspect relates to provide an improved wind turbine blade, which in particular facilitates the handling of the blade and which exhibits improved aerodynamical properties.

According to embodiments of the invention, this aspect is solved by a wind turbine blade as initially described, wherein the plurality of add-on elements comprises at least one flexible add-on element and at least one stiff add-on element of the same add-on element type, wherein the flexible add-on element consists at least predominantly of an elastic material and the stiff add-on element consists at least predominantly of a stiff material, which is stiffer than the elastic material, wherein the flexible add-on element and the stiff add-on element are arranged offset in span-wise direction and/or in chord-wise direction of the blade.

The at least one flexible add-on element and the at least on stiff add-on element are of the same add-on element type. In particular, they may serve the same purpose and/or exhibit the same shape and/or geometry. The add-ons may be in particular aerodynamical and/or acoustic add-ons used for enhancing the aerodynamic properties of the blade and/or to reduce noise generated during the operation of the wind turbine blade.

The flexible add-on elements and the stiff add-on elements are arranged offset in span-wise direction, hence in the direction from the root of the blade to the tip of the blade. Additionally or alternatively, the flexible add-on elements and the stiff add-on elements may also be arranged offset in chord-wise direction, hence in the direction from the leading edge to the trailing edge of the blade, or around the circumference of the blade, respectively.

A row of add-on elements arranged for instance in span-wise direction on the blade may comprise flexible add-on elements and stiff add-on elements, wherein the flexible add-on elements are arranged within one or more portions on the surface of the blade and the stiff add-on elements are arranged outside of these portions. Hence, the row of add-on elements may comprise at least one section with one or more flexible add-on elements and at least one section with one or more stiff add-on elements. This is also applicable to add-on elements of the same add-on element type that are arranged in a chord-wise direction around the circumference of the blade and/or to add-on elements of the same add-on element type, which are arranged offset both in span-wise and chord-wise direction.

Embodiments of the invention have the advantage that it combines flexible add-on elements with stiff add-on elements making use of the elastic abilities of the flexible add-on elements and the better aerodynamic properties of the stiff add-on elements. A distributed arrangement of the flexible and the stiff add-on elements on the surface of the blade allows for adapting the mechanical properties, hence the flexibility or the stiffness, of the add-on elements to the local requirements.

The elastic material of the flexible add-on elements enables the flexible add-on elements to be deformable and to recover their shape after a force or a pressure was applied to the add-on element. This inherent flexibility, or elasticity, respectively, of the flexible add-on elements may cause a reduced aerodynamic and/or acoustic efficiency. It may be possible that the flexible add-on elements require a different geometry compared to stiff add-on elements of the same add-on type resulting in a reduced efficiency of the flexible add-on elements.

The flexible add-on elements, which consist at least predominantly of an elastic material and which are more elastic than the stiff add-on elements, may be arranged in particular in areas where the add-on elements more likely come in contact with other objects and hence are subject to a higher risk of being damaged, in particular during blade handling. Blade handling occurs for instance during blade fabrication, transport and/or installation and refers to all processes in which the blade is moved and/or stored.

In other areas, which are not used in blade handling processes and/or which are distant from the areas used in the blade handling processes, the stiff add-on elements may be arranged. They consist at least predominantly of a stiff material, which is stiffer than the elastic material and are therefore less flexible respectively way stiffer than the elastic add-on elements. This allows for making use of their superior aerodynamic properties. Advantageously, the amount of flexible add-on elements is limited to the areas, in which their flexibility is useful, in particular with regard to the handling of the wind turbine blade. In other areas, or portions on the blade surface, respectively, the stiff add-on elements may be arranged to make use of their better aerodynamic and/or acoustic efficiency compared to the flexible add-on elements.

The layout of the add-on elements according to embodiments of the invention enables a better blade performance than an add-on element layout comprising only fully flexible or rubber-like add-on elements or than an add-on element layout that omits areas used for blade handling. Furthermore, the positioning of the add-ons elements on the blade can be optimized by having reduced constrains arising from the areas required for blade handling. Advantageously, the blade is aerodynamically ready to operate when it leaves the factory, reducing the workload during the turbine installation process. In particular, a mounting of the add-on elements after the installation may be avoided. This allows for omitting rope-accessing procedures and therefore significantly accelerates the installation and commissioning process during the installation of a wind turbine.

It is possible that the wind turbine blade comprises add-on elements of two or more add-on element types, wherein for each of the add-on element types, the stiff add-on elements and flexible add-on elements are arranged offset in span-wise direction and/or in chord-wise direction of the blade. In particular, it is possible that the flexible add-on elements of different add-on types are arranged in the same surface portion, or portions, respectively, and that the stiff add-on elements of these types are arranged outside of this portion, or these portions, respectively.

The blade comprises at least one blade handling zone provided as a contact area for a blade lifting means and/or a blade storage means, wherein the blade handling zone extends within a span-wise segment of the outer surface in chord-wise direction at least partially around the outer circumference of the blade, wherein the flexible add-on element is arranged within the blade handling zone and the stiff add-on element is arranged outside of the blade handling zone.

It is in particular possible that more than one flexible add-on element is arranged within the blade handling zone and that one or more stiff add-on elements are arranged outside of the blade handling zone on the outer surface of the blade. The blade handling zones, or blade handling areas, respectively, are used to lift the blade using a blade lifting means, for instance during fabrication, prior and after a transport of the blade and/or during the installation of the blade to a hub of a wind turbine. The same blade handling zones or further blade handling zones may also be used for storing the blade by placing the blade with at least one of the blade handling zones on a blade storage means for supporting the blade in a storage location and/or during transport.

A blade handling zone, in which one or more flexible add-on elements are arranged, is adapted to be contacted to or by a blade lifting means and/or a blade storage means, wherein the usage of the flexible add-on elements in this area protects the add-ons from being damaged during the lifting procedure and/or during transport or storage. Outside of the blade handling zones, there is no contact of the blade surface with a lifting means and/or a storage means, so that advantageously the stiff add-on elements may be used. Advantageously, the handling equipment like lifting means and storage means can be optimized by having reduced or no constraints resulting from the add-on element layout.

A blade handling zone used for lifting the blade may be adapted to be contacted by a blade lifting means like a clamping tool and/or a sling, which each are in direct contact to at least a portion of the circumference of the blade. The blade lifting means may be used for instance during installation of the blade to lift the blade from a transportation vehicle or from the ground towards the hub of a wind turbine tower. For storing the blade, the blade handling zones may be contacted by a blade storage means, for instance support elements which allow to support the wind turbine blade on the ground and/or on a transportation vehicle.

A blade lifting means and/or a blade storage means may be in contact with the entire blade handling zone or it may be in contact with a portion of the blade handling zone, when the blade handling zone allows for some offset in the position of the lifting and/or storage means. In both cases, the add-on elements arranged in these blading handling zone come in contact with the respective means or they are arranged close to the respective means and have at least a high risk of unintendedly contacting the respective means during blade handling.

One or more flexible add-on elements are arranged in a surface portion of the blade, which has a span-wise length between 1 m and 5 m and extends in chord-wise direction at least partly around the outer circumference of the blade, wherein the center of the surface portion in span-wise direction is distanced from a root-side end of the blade between 33% and 50% of the span-wise length of the blade, wherein the stiff add-on element is arranged outside of the surface portion.

The center of the surface portion lies in a distance of one third to one half of the entire span-wise length of the blade, measured from the root-side or hub-wise end of the blade. The width of this region is between 1 m and 5 m, wherein the surface portion extends at least partly around the outer circumference of the blade. An area like this may be used in particular as a blade handling zone for storing the wind turbine blade, in particular in addition with a further blade handling zone directly at the root-side end of the blade. The span-wise position of the blade handling zone at one third to one half of the blade's span-wise length enables to support the entire blade using only the root-side handling zone as further handling zone due to the span-wise weight distribution of the blade.

In an exemplary embodiment of the invention, one or more flexible add-on elements are arranged in a pair of surface portions, which each have a span-wise length between 1 m and 5 m and which each extend in chord-wise direction at least partly around the outer circumference of the blade, wherein the surface portions are arranged offset in span-wise direction around the center of gravity of the blade, wherein the at least one stiff add-on element is arranged outside of the surface portions.

This pair of surface portion may be used as pair of blade handling zones and in particular as contact areas for one or more blade lifting means to lift the blade. Each of the pair of surface portions is arranged to each side in span-wise direction around a center of gravity of the blade. Each of the surface portions has a length of 1 m and 5 m in span-wise direction. Each of the surface portion may extend in chord-wise direction partly or entirely around the circumference of the blade. Within these surface portions, one or more flexible add-on elements are arranged, while the at least one stiff add-on element is arranged outside of these surface portions.

The surface portions of the pair of surface portions are arranged each in a span-wise distance between 10 m and 15 m to the center of gravity. The distance between 10 m and 15 m is measured from the span-wise position of the center of gravity, since it may lie inside the wind turbine blade.

In an exemplary embodiment of the invention, the blade comprises a root-side handling zone with a span-wise length between 1 m and 5 m, wherein the root-side handling zone extends in chord-wise direction around the entire circumference of the blade, wherein the add-on elements are arranged outside of the root-side handling zone.

Since the wind turbine blade has the lowest circumferential speed in its root-side portion attached to the hub of the wind turbine during operation, the arrangement of add-on elements is normally not required for this region. Therefore, both the flexible add-on elements and the stiff add-on elements are arranged outside of the root-side handling portion that extends from the root-side end of the blade for 1 m to 5 m in span-wise direction on the surface of the blade.

The add-on elements of the same add-on element type are vortex generators, trailing edge profiles, blade surface flaps, or sensor means. Hence, the wind turbine blade may comprise both flexible vortex generators and stiff vortex generators, which are arranged offset in chord-wise and/or span-wise direction of the blade. In addition or alternatively, the wind turbine blade may comprise flexible trailing edge profiles and stiff trailing edge profiles, flexible blade surface flaps and stiff blade surface flaps and/or flexible sensor means and stiff sensor means. The sensor means may be for instance sensors used for measuring an aerodynamic property of the blade and/or an aerodynamic condition of an air flow next to or in the vicinity of the blade surface.

In an exemplary embodiment of the invention, the elastic material of the flexible add-on element is an elastomeric material, in particular a rubber and/or thermoplastic elastomer. In particular, the elastomeric material may be a material or a composite material which is UV-stable and/or weather resistant to avoid wear to the flexible add-on elements during operation of the wind turbine.

The elastomeric material has a Shore hardness between A30 and A95, in particular between A60 and A90. Flexible add-on elements consisting at least predominantly of an elastomeric material with a Shore hardness between A30 and A95, in particular between A60 and A90, exhibit a flexible or elastomeric behaviour that is sufficient for not being damaged during blade handling when they are arranged in the handling zones of the blade. Furthermore, this elasticity of the flexible add-on element also allows for good aerodynamic properties of the flexible add-on elements as well.

In an exemplary embodiment of the invention, the stiff material of the stiff add-on elements is a polymer material, in particular acrylonitrile styrene acrylate (ASA). A stiff and hard polymer material like ASA is weather and UV-resistant and may therefore be used advantageously for fabricating stiff add-on elements. Also, other polymer materials than ASA may be used as long as they provide the requested properties.

The stiff material has a Young's modulus between 1000 MPa and 4000 MPa, in particular between 1500 MPa and 3000 MPa.

A wind turbine according to embodiments of the invention comprises at least one wind turbine blade according to embodiments of the invention. In particular, all wind turbine blades of the wind turbine are wind turbine blades according to embodiments of the invention.

The advantages and details described in relation to the wind turbine blade according to embodiments of the invention apply correspondingly to the wind turbine according to embodiments of the invention and vice versa.

BRIEF DESCRIPTION

Some of the embodiments will be described in detail, with reference to the following figures, wherein like designations denote like members, wherein.

DETAILED DESCRIPTION

Figure 1:
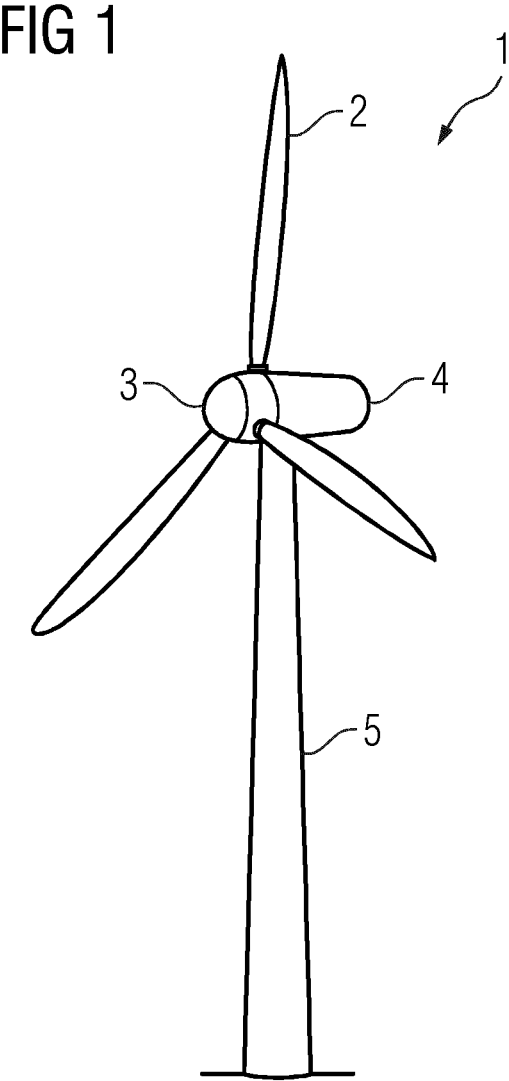
FIG. 1 shows an embodiment of a wind turbine according to the invention.

In FIG. 1, a wind turbine 1 according to embodiments of the invention is shown. The wind turbine 1 comprises three wind turbine blades 2, which are mounted to a hub 3 of the wind turbine 1. The hub 3 is arranged on a frontside of the wind turbine 1 to a nacelle 4 of the wind turbine 1, wherein the nacelle 4 is supported by a tower 5 of the wind turbine 1.

Figure 2:
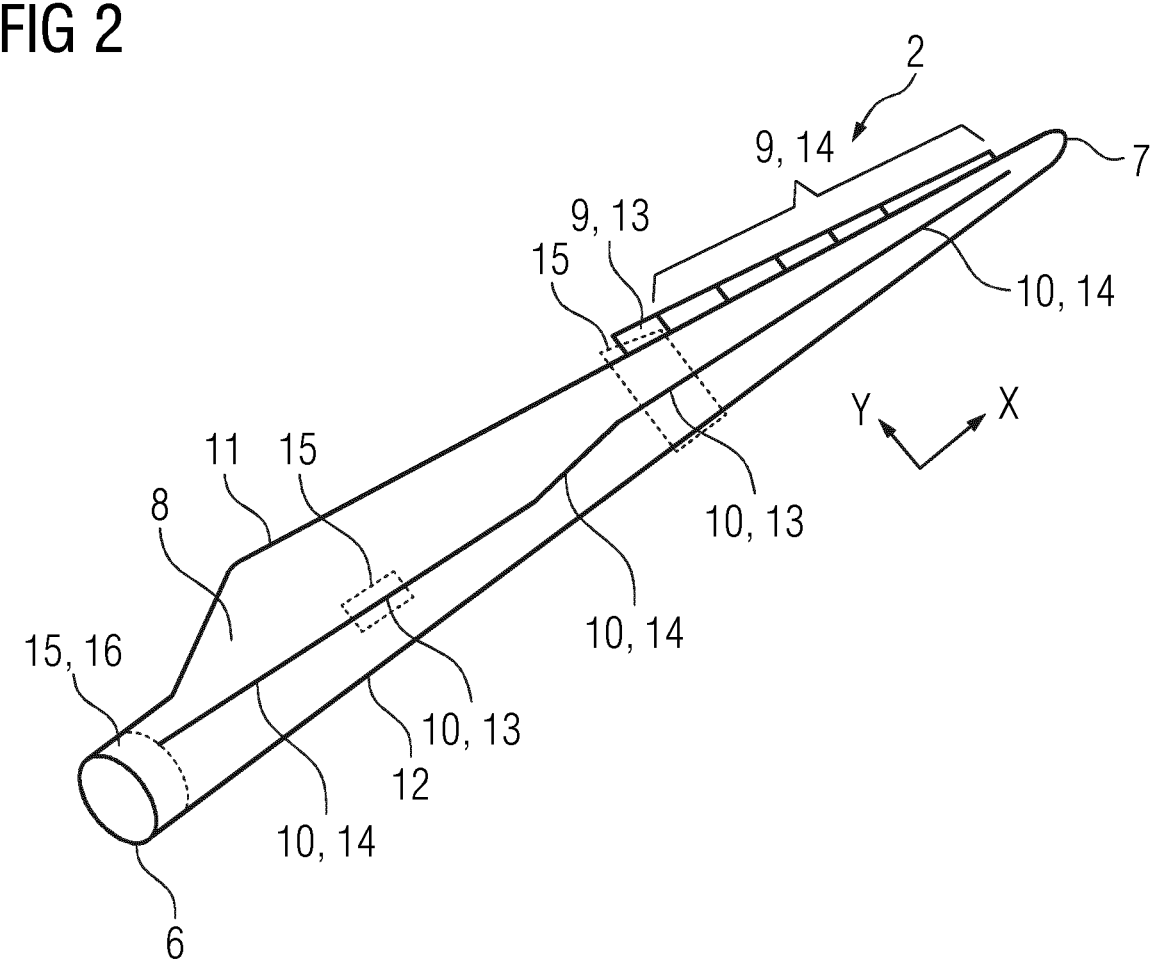
FIG. 2 shows a first embodiment of a wind turbine blade according to the invention.

In FIG. 2, a first embodiment of a wind turbine blade 2 is shown. The wind turbine blade 2 comprises a root-side end 6 and a tip 7, wherein the span-wise direction of the wind turbine blade 2 extending from the root-side end 6 to the tip 7 is denoted as x-direction. The chord-wise direction, which is perpendicular to the span-wise direction and extends from a trailing edge 11 to a leading edge 12 of the wind turbine blade 2, is denoted correspondingly as y-axis.

The wind turbine blade 2 comprises an outer surface 8, which forms the shell of the wind turbine blade 2. To the outer surface 8 of the blade 2, a plurality of add-on elements 9, 10 is arranged. The add-on elements 9, 10 are of different add-on element types, wherein the add-on elements 9 are edge profiles attached to the trailing edge 11 of the wind turbine blade 2 and wherein the add-on elements 10 are blade surface flaps that are arranged on the outer surface 8 of the wind turbine blade 2 between the leading edge 12 and the trailing edge 11 of the blade 2. The trailing edge profiles 9 comprise one flexible add-on element 13 and a plurality of stiff add-on elements 14. Also, the plurality of blade surface flaps 10 comprises flexible add-on elements 13 and stiff add-on elements 14.

For the add-on elements 10, hence the blade surface flaps, the indicated flexible add-on element 13 and the stiff add-on elements 14 may be provided as a plurality of flexible elements 13, or stiff add-on elements 14, respectively, which are arranged adjacently to each other.

The flexible add-on elements 13 of each of the add-on element types consist at least predominantly of an elastic material, in particular of an elastomer. For instance, the flexible add-on elements 13 may consist at least predominantly of a rubber and/or a thermoplastic elastomer material. The flexible add-on elements 13 therefore exhibit elastomeric properties, so that they may deform when a force or pressure is applied to them and return in their original shape once the pressure of the force is removed.

The stiff add-on elements 14 consist at least predominantly of a stiff material, which is stiffer than the elastic material of the flexible add-on elements 13. Therefore, the stiff add-on elements 14 are more rigid than the flexible add-on elements 13. As material for the stiff add-on elements 14, a hard polymer material like acrylonitrile styrene acrylate (ASA) may be used due to its mechanical properties and its resistivity against environmental influences.

The wind turbine blade 2 comprises a plurality of handling zones 15, which are provided as contact areas for a blade lifting means and/or a blade storage means during fabrication, transport and/or installation of the wind turbine blade 2. Each of the handling zones 15 extends within a span-wise segment of the outer surface 8 in chord-wise direction at least partially around the outer circumference of the blade 2. The flexible add-on elements 14 of both add-on types are arranged in the blade handling zones 15, wherein the stiff add-on elements 14 are arranged outside of the handling zones 15. This allows for storing, transporting and installing the wind turbine blade without an unintended contact between the stiff add-on elements 14 and the lifting or storing means.

The flexible add-on elements 13 are less prone to be damaged when contacting a lifting means and/or a storing means used for handling of the wind turbine blade 2. However, the stiff add-on elements 14 may have superior aerodynamic properties compared to the flexible add-on elements 13 since they consist predominantly of a stiff material which is more resistant also against deformations during the operation of the wind turbine 1. Therefore, the offset arrangement of the flexible add-on elements 13 and the stiff add-on elements 14 on the outer surface 8 of the wind turbine blade 2 allows for providing the flexible add-on elements 13 in the areas, like the blade handling zones 15, in which their flexibility is desired. Outside of these areas, the stiff add-on elements 14 are arranged, so that their better aerodynamic characteristics and/or their better resistance against environmental influences may be used.

This layout of the add-on elements 9, 10 significantly facilitates the transportation and the storage of the wind turbine blades 2, since the risk for damaging the blade add-on elements 9, 10 is reduced. Furthermore, also the installation process of the wind turbine blade 2 is facilitated, since all add-on elements 9, 10 may be provided on the outer surface 8 of the blade 2 during fabrication, so that it is not necessary to arrange them after the installation of the blade 2 to the hub 3.

The elastomeric material for the flexible add-on elements 13 has a Shore hardness between A30 and A95, in particular between A60 and A90. The elastomeric material is in particular UV-resistant and may be a soft and/or thermoplastic elastomer or a rubber. The stiff material for the stiff add-on elements 14 has a Young's modulus between 1000 MPa and 4000 MPa, in particular between 1500 MPa and 3000 MPa.

The positioning of the blade handling zones 15 shown in FIG. 2 is only exemplarily. It is in particular possible that the wind turbine blade comprises more than the depicted blade handling zones 15 and/or that they are arranged at a different position on the outer surface 8 of the blade 2. In particular, the wind turbine blade 2 may comprise a root-side handling zone 16, which is arranged at the root-side end 6 of the wind turbine blade 2. The root-side handling zone 16 may have a span-wise length between 1 m and 5 m, wherein all add-on elements 9, 10 are arranged outside of the root-side handling zone 16.

Figure 3:
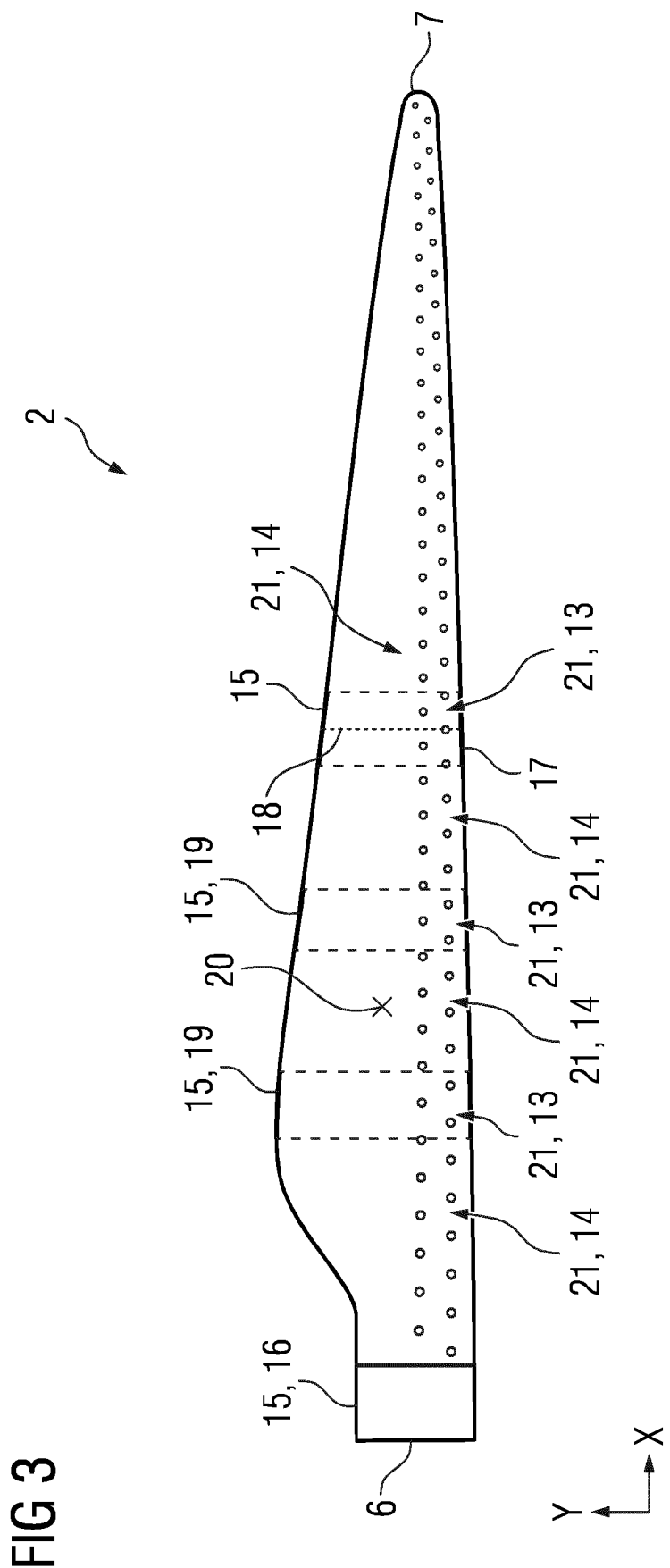
FIG. 3 shows a second embodiment of a wind turbine blade according to the invention.

In FIG. 3, an example for the positioning of the handling zones 15 along the span-wise length x of the blade 2 is shown for a second embodiment of a wind turbine blade 2.

One of the handling zones 15 is arranged in a surface portion 17 of the blade, wherein the surface portion 17 has a span-wise length between 1 m and 5 m. The surface portion 17 expands at least partly around the outer circumference of the blade 2 in chord-wise direction y. The distance between a center 18 of the surface portion 17 and the root-side end 6 of the wind turbine blade is between 33% and 50% of the entire span-wise length of the blade 2 between the root-side end 6 and the tip 7. The surface portion 17 is a blade handling zone 15, which may be used for instance together with the root-side handling zone 16 for storing the wind turbine blade 2. Therefore, the wind turbine blade 2 may be placed on the blade storage means, which contacts the outer surface of the blade in these areas. By arranging the flexible add-on elements in these areas and the stiff add-on elements 14 outside of these areas, an unintended damage to the stiff add-on elements 14 may be avoided.

The blade 2 comprises two additional handling zones 15 in a pair of surface portions 19, which each have a span-wise length between 1 m and 5 m. Each of the surface portions of the pair 19 are surface portions extends in chord-wise direction at least partly around the outer circumference of the blade 2. The surface portions of the pair of surface portions are arranged offset in span-wise direction x around a center of gravity 20 of the blade 2. The distance between the closer edge of each of the surface portions 19 and the span-wise position of the center of gravity 20 is for instance between 10 m and 15 m.

The blade 2 comprises a plurality of add-on elements 21, which each are vortex generators. The flexible add-on elements 13 of the plurality of vortex generators are arranged in the blade handling zones 15, wherein in the root-side handling portion 16 no vortex generators are arranged. The stiff add-on elements 14 of the vortex generators are arranged outside of the blade handling zones 15. Additionally or alternatively, an offset arrangement in span-wise direction x of the blade 2, also an offset arrangement in chord-wise direction is possible for the add-on elements 9, 10, 21. This may be applied to add-on elements that are arranged at least partly around the outer circumference, wherein only some of the intended positions for the add-on elements 9, 10, 21 overlap with the blade handling zones 15.

It is in particular possible that the wind turbine blade comprises another number of add-on elements 21 and/or another positioning of the add-on elements 21 on the outer surface 8 of the blade 2. Furthermore, it is possible that a wind turbine blade comprises vortex generators, trailing edge profiles, blade surface flaps, aerodynamic and/or acoustic sensor elements and/or any combination of them as type of add-on elements 9, 10, 21, wherein for each of these types of add-on elements, flexible add-on elements 13 and stiff add-on elements 14 may be provided and arranged correspondingly to the aforementioned embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade comprising a plurality of add-on elements, which are arranged on an outer surface of the blade, wherein the plurality of add-on elements comprises at least one flexible add-on element and at least one stiff add-on element of the same add-on element type, wherein the at least one flexible add-on element consists at least predominantly of an elastic material and the at least one stiff add-on element consists at least predominantly of a stiff material, which is stiffer than the elastic material, wherein the at least one flexible add-on element and the at least one stiff add-on element are arranged offset in a span-wise direction and/or in a chord-wise direction of the blade,
wherein one or more flexible add-on elements of the at least one flexible add-on element are arranged in a surface portion of the blade, which has a span-wise length between 1 m and 5 m and extends in the chord-wise direction at least partly around an outer circumference of the blade, wherein a center of the surface portion in the span-wise direction is distanced from a root-side end of the blade between 33% and 50% of the span-wise length of the blade, wherein the at least one stiff add-on element is arranged outside of the surface portion.

2. The wind turbine blade according to claim 1, wherein the blade comprises at least one blade handling zone provided as contact area for a blade lifting means and/or a blade storage means, wherein the at least one blade handling zone extends within a span-wise segment of the outer surface in the chord-wise direction at least partially around the outer circumference of the blade, wherein the at least one flexible add-on element is arranged within the at least one blade handling zone and the at least one stiff add-on element is arranged outside of the at least one blade handling zone.

3. The wind turbine blade according to claim 1, wherein another one or more flexible add-on elements of the at least one flexible add-on element are arranged in a pair of surface portions, which each have a span-wise length between 1 m and 5 m and which each extend in the chord-wise direction at least partly around the outer circumference of the blade, wherein the surface portions are arranged offset in the span-wise direction around the center of gravity of the blade, wherein the at least one stiff add-on element is arranged outside of the surface portions.

4. The wind turbine blade according to claim 3, wherein the surface portions of the pair of surface portions are arranged each in a span-wise distance between 10 m and 15 m to the center of gravity.

5. The wind turbine blade according to claim 1, wherein the blade comprises a root-side handling zone with a span-wise length between 1 m and 5 m, wherein the root-side handling zone extends in the chord-wise direction around the entire circumference of the blade, wherein the add-on elements are arranged outside of the root-side handling zone.

6. The wind turbine blade according to claim 1, wherein the add-on elements of the same add-on element type are vortex generators, trailing edge profiles, blade surface flaps, or sensor means.

7. The wind turbine blade according to claim 1, wherein the elastic material of the at least one flexible add-on element is an elastomeric material.

8. The wind turbine blade according to claim 7, wherein the elastomeric material has a Shore hardness between A30 and A95.

9. The wind turbine blade according to claim 1, wherein the stiff material of the at least one stiff add-on element is a polymer material.

10. The wind turbine blade according to claim 9, wherein the stiff material has a Young's modulus between 1000 MPa and 4000 MPa.

11. A wind turbine comprising at least one wind turbine blade according to claim 1.

12. The wind turbine blade according to claim 1, wherein the stiff material of the at least one stiff add-on element is acrylonitrile styrene acrylate.

13. A wind turbine blade comprising a plurality of add-on elements, which are arranged on an outer surface of the blade, wherein the plurality of add-on elements comprises at least one flexible add-on element and at least one stiff add-on element of the same add-on element type, wherein the at least one flexible add-on element consists at least predominantly of an elastic material and the at least one stiff add-on element consists at least predominantly of a stiff material, which is stiffer than the elastic material, wherein the at least one flexible add-on element and the at least one stiff add-on element are arranged offset in a span-wise direction and/or in a chord-wise direction of the blade, wherein one or more flexible add-on elements of the at least one flexible add-on element are arranged in a pair of surface portions, which each have a span-wise length between 1 m and 5 m and which each extend in the chord-wise direction at least partly around the outer circumference of the blade, wherein the surface portions are arranged offset in the span-wise direction around the center of gravity of the blade, wherein the at least one stiff add-on element is arranged outside of the surface portions.

14. The wind turbine blade according to claim 13, wherein the blade comprises at least one blade handling zone provided as contact area for a blade lifting means and/or a blade storage means, wherein the at least one blade handling zone extends within a span-wise segment of the outer surface in the chord-wise direction at least partially around the outer circumference of the blade, wherein the at least one flexible add-on element is arranged within the at least one blade handling zone and the at least one stiff add-on element is arranged outside of the at least one blade handling zone.

15. The wind turbine blade according to claim 13, wherein another one or more flexible add-on elements of the at least one flexible add-on element are arranged in a surface portion of the blade, which has a span-wise length and extends in the chord-wise direction at least partly around the outer circumference of the blade, wherein a center of the surface portion in the span-wise direction is distanced from a root-side end of the blade between 33% and 50% of the span-wise length of the blade, wherein the at least one stiff add-on element is arranged outside of the surface portion.

16. The wind turbine blade according to claim 13, wherein the surface portions of the pair of surface portions are arranged each in a span-wise distance between 10 m and 15 m to the center of gravity.

17. The wind turbine blade according to claim 13, wherein the blade comprises a root-side handling zone with a span-wise length between 1 m and 5 m, wherein the root-side handling zone extends in the chord-wise direction around the entire circumference of the blade, wherein the add-on elements are arranged outside of the root-side handling zone.

18. The wind turbine blade according to claim 13, wherein the add-on elements of the same add-on element type are vortex generators, trailing edge profiles, blade surface flaps, or sensor means.

19. The wind turbine blade according to claim 13, wherein the elastic material of the at least one flexible add-on element is an elastomeric material and/or wherein the stiff material of the at least one stiff add-on element is a polymer material.

20. A wind turbine comprising at least one wind turbine blade according to claim 13.

* * * * *